United States Patent [19]

Nishizawa et al.

[11] Patent Number: 4,497,944

[45] Date of Patent: Feb. 5, 1985

[54] PROCESS FOR PRODUCING POLYAMIDE-IMIDE RESIN

[75] Inventors: Hiroshi Nishizawa, Kitaibaraki; Yoshiyuki Mukoyama, Hitachi, both of Japan

[73] Assignee: Hitachi Chemical Company, Ltd., Tokyo, Japan

[21] Appl. No.: 439,200

[22] Filed: Nov. 4, 1982

[30] Foreign Application Priority Data

Nov. 6, 1981 [JP] Japan .................................. 56-178767

[51] Int. Cl.$^3$ .............................................. C08G 73/14
[52] U.S. Cl. ...................................... 528/49; 524/600; 525/432; 525/436; 528/48; 528/52; 528/73; 528/74; 528/179
[58] Field of Search ...................... 528/179, 48, 49, 52, 528/73, 74; 524/600; 525/432, 436

[56] References Cited

U.S. PATENT DOCUMENTS 4,354,965 10/1982 Lee et al. ............................ 528/179

Primary Examiner—Lester L. Lee
Attorney, Agent, or Firm—Antonelli, Terry & Wands

[57] ABSTRACT

A polyamide-imide resin which can give a varnish having a high resin content, excellent in storage stability and heat resistant final products such as insulated wire can be produced by reacting an aromatic diisocyanate with a tricarboxylic acid anhydride in the presence of a basic solvent while adjusting the resin content at 40% by weight or more, and adding a compound having one active hydrogen atom before, during or after the above-mentioned reaction so as to adjust the reduced viscosity of the resin to 0.27 or lower.

21 Claims, No Drawings

PROCESS FOR PRODUCING POLYAMIDE-IMIDE RESIN

BACKGROUND OF THE INVENTION

This invention relates to a process for producing a polyamide-imide resin which can give a varnish having a high resin content an which is excellent in storage stability and useful particularly as a varnish for heat-resistant electric wire.

In the prior art, as polyamide-imide resins used in varnishes for heat-resistant electric wire, there have heretofore been used those which are obtained by using N-methylpyrrolidone (NMP) as a solvent for synthesis and which have a reduced viscosity (concentration: 0.5 g/dl, solvent: dimethylformamide, measurement temperature: 30° C.) of more than 0.4 and have a sufficiently increased molecular weight. On the other hand, since the solution viscosities of varnishes for electric wire are set at about 30 poises (30° C.) because of restriction as to coating workability, the resin content of the above-mentioned polyamide-imide resins with a high molecular weight satisfying this requirement has an upper limit of about 30% by weight even if a good solvent NMP is used. Therefore, when such polyamide-imide resins with a high molecular weight are used in varnishes for electric wire, a large amount of expensive NMP must be used, and this poses a problem from the viewpoint of the cost.

One method for reducing the cost by decreasing the amount of NMP used, thus increasing the resin content is to lower the molecular weight of the resin. However, when the molecular weight of a polyamide-imide resin obtained from a diisocyanate and a tricarboxylic acid anhydride is lowered so that the reduced viscosity of the resin may be 0.4 or lower, the terminal functional group concentration of the resin increases, so that the viscosity of the resulting varnish increases gradually with the lapse of time, which results in causing a problem of marked lowering of the storage stability. In the case where the viscosity has increased as days go by, when the resin is used, for example, as a varnish for electric wire, there are caused inconveniences such as the alteration of initially set coating conditions and the adjustment of the viscosity by diluting the varnish having an increased viscosity with a solvent, and the characteristics of a protective coating film formed by volatilizing the solvent sometimes vary.

Particularly when the varnish is used, for example, in a circuit board for an electronic part, a film of several microns in thickness should be formed, and hence the change of the viscosity is a serious problem.

There is also a proposal aiming at removing these disadvantages, of a process for producing a stabilized polyamide-imide resin capable of having a high resin content in which the terminal functional groups are masked with a specific active-hydrogen-containing compound. This process greatly improves the storage stability of a polyamide-imide resin having a lowered molecular weight, but this process requires a more strict stabilizing technique for polyamide-imide resins which have a lowered molecular weight for making the reduced viscosity 0.3 or lower and which have a greatly increased resin content. That is say, it is necessary to devise a stabilizing method so that polyamide-imide resins stabilized in such a low molecular weight region may show sufficient cure reactivity at the time of baking and curing. Particularly when there is used an active-hydrogen-containing compound wherein the terminal functional groups are masked by thermally irreversible bonding groups in a usual baking temperature range, the resulting resin is greatly lowered in cure reactivity, though it is excellent in storage stability.

SUMMARY OF THE INVENTION

An object of this invention is to provide a process for producing a stabilized polyamide-imide resin which is free from such problems, can have a greatly increased resin content, is excellent in storage stability and cure reactivity, and is useful particularly as a varnish for heat-resistant electric wire.

This invention provides a process for producing a polyamide-imide resin, which comprises reacting approximately equimolar amounts of an aromatic diisocyanate (I) with a tricarboxylic acid anhydride (II) in the presence of a basic solvent while adjusting the resin content at 40% by weight or more, and adding at least one compound (III) having one active hydrogen atom (except for phenolic compounds: the same applies hereinafter) before, during or after the above-mentioned reaction so as to adjust the reduced viscosity of the resin to 0.27 or lower.

DESCRIPTION OF PREFERRED EMBODIMENTS

According to this invention, there can be obtained a polyamide-imide resin which can give a varnish having a high resin content of 40% by weight or more, excellent in long-term storage stability, and can be used particularly in varnishes for heat-resistant electric wire.

The aromatic diisocyanate used in this invention includes, for example, tolylene diisocyanate, xylylene diisocyanate, 4,4'-diphenylether diisocyanate, naphthylene-1,5-diisocyanate, 4,4'-diphenylmethane diisocyanate, etc. When the heat resistance and the like are taken into consideration, it is preferable to use 4,4'-diphenylmethane diisocyanate or tolylene diisocyanate. If necessary, there may be co-used aliphatic diisocyanates such as 1,6-hexamethylene diisocyanate, isophorone diisocyanate and the like, alicyclic diisocyanates, trimers thereof, isocyanurate-ring-containing polyisocyanates obtained by trimerization reaction of the aforesaid aromatic diisocyanates, polyphenylmethyl polyisocyanates, e.g., a phosgenated condensate of aniline and formaldehyde, etc. In particular, isocyanurate-ring-containing polyisocyanates obtained by trimerization reaction of tolylene diisocyanate or 4,4'-diphenylmethane diisocyanate which are effective for improving the heat resistance, are preferred and their using amount is preferably 0.03 to 0.20 equivalent per equivalent of the aromatic diisocyanate when the resulting varnish is used for heat-resistant electric wire.

As the tricarboxylic acid anhydride, there can be used, for example, compounds represented by the general formulas (i) and (ii);

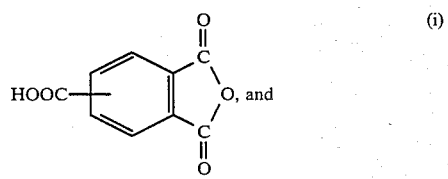

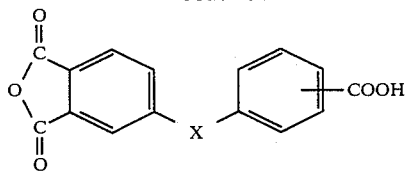

(ii)

wherein X is —CH₂—, —CO—, —SO₂—, —O— or the like. When the heat resistance, the cost and the like are taken into consideration, trimellitic acid anhydride is preferred.

If necessary, polycarboxylic acids or acid anhydrides thereof other than the tricarboxylic acid anhydrides described above may also be co-used. As such polycarboxylic acids, there can be used, for example, trimellitic acid, trimesic acid, tris(2-carboxyethyl) isocyanurate, terephthalic acid, isophthalic acid, succinic acid, adipic acid, sebacic acid, dodecanedicarboxylic acid and the like.

As the polycarboxylic acid anhydrides, there can be used dianhydrides of tetrabasic acids, for example, aliphatic and alicyclic tetrabasic acids such as 1,2,3,4-butanetetracarboxylic acid, cyclopentanetetracarboxylic acid, ethylenetetracarboxylic acid, bicyclo[2,2,2]-octo-(7)-ene-2:3,5:6-tetracarboxylic acid and the like; aromatic tetrabasic acids such as pyromellitic acid, 3,3',4,4'-benzophenonetetracarboxylic acid, bis(3,4-dicarboxyphenyl)ether, 2,3,6,7-naphthalenetetracarboxylic acid, 1,2,5,6-naphthalenetetracarboxylic acid, ethylene glycol bistrimellitate, 2,2'-bis(3,4-biscarboxyphenyl)propane, 2,2',3,3'-diphenyltetracarboxylic acid, perylene-3,4,9,10-tetracarboxylic acid, 3,4-dicarboxyphenylsulfonic acid and the like; heterocyclic tetrabasic acids such as thiophene-2,3,4,5-tetracarboxylic acid, pyrazinetetracarboxylic acid and the like; etc.

These polycarboxylic acids or acid anhydrides thereof may be used for improving resin characteristics such as flexibility, solubility in solvents, melt-flow characteristics (processability) in molding and processing, cure reactivity, and the like. In particular, 3,3',4,4'-benzophenonetetracarboxylic acid dianhydride effective for improving the cure reactivity is preferred. The using amount of 3,3',4,4'-benzophenonetetracarboxylic acid dianhydride is preferably in the range of 0.03 to 0.2 mole per mole of the tricarboxylic acid anhydride.

The aromatic diisocyanate and the tricarboxylic acid anhydride are reacted in approximately equimolar amounts. When they are reacted in approximately equimolar amounts, a polyamide-imide resin having a sufficiently high molecular weight is obtained at the time of baking and curing, and shows the best heat resistance and flexibility. Although the diisocyanate compound may be added in slightly excessive amount of moles in consideration of the fact that a small amount of water contained as an impurity in the reaction solvent reacts with isocyanate groups, the amount of the aromatic diisocyanate compound must not be more than 1.1 moles per mole of the tricarboxylic acid anhydride.

As the basic solvent, there can be used those which are substantially inert to the aromatic diisocyanates. For example, N-methylpyrrolidone, dimethylformamide, dimethylacetamide and the like can be used. As a synthesis solvent for the aromatic diisocyanate and the tricarboxylic acid anhydride, N-methylpyrrolidone is preferred. As a dilution solvent used after the reaction, dimethylformamide is preferred. Dimethylformamide has an effect of lowering the solution viscosity of the resulting varnish, and contributes to the increase of the resin content.

As to the resin concentration during the reaction, when the resin content is less than 40% by weight, the excess solvent should be removed after the synthesis by complicated procedures such as condensation or the like, so that an economical disadvantage is brought about. When the cost, the performance characteristics and the like are taken into consideration, the resin content is preferably 40 to 80% by weight. Here, the term "resin content" means the concentration of the sum of the aromatic diisocyanate and the tricarboxylic acid anhydride in the reaction system. However, the amount of at least one compound having one active hydrogen in the molecule to be used is not included in this calculation.

As the compound having one active hydrogen in the molecule used in this invention, there can be used those which mask free isocyanate or acid anhydride groups remaining at the ends of the polyamide-imide resin molecules to exhibit an effect for giving longterm storage stability, and which have such a property that in a step of coating and baking onto a substrate, they rapidly regenerate free isocyanate or acid anhydride groups by thermal diissociation reaction or ring closure reaction and hence do not inhibit cure reaction. As such compounds there can be used, for example, lactams such as 2-pyrrolidone, ε-caprolactam, lauryllactam and the like; monohydric alcohols having 1 to 10 carbon atoms such as methanol, ethanol, n-butanol, t-butanol, methyl Cellosolve, ethyl Cellosolve, methylcarbitol, benzyl alcohol, cyclohexanol, ω-hydro.perfluoro alcohol and the like; amides such as succinimide, phathalimide, maleimide, benzoic acid o-sulfimide and the like; imidazoles, e.g., imidazole and substituted derivatives thereof such as 2-methylimidazole, 2-ethylimidazole, 2-phenylimidazole and the like; imines such as ethyleneimine and the like; oximes such as 2-butanone oxime, formaldoxime, acetaldoxime, cyclohexanone oxime and the like; 2-oxazoline; etc. From the viewpoints of easiness of handling, safety, cost, stabilizing effect and the like, it is preferable to use lactams, oximes and alcohols. In particular, ε-caprolactam which does not damage cure reactivity is more preferred. These compounds having one active hydrogen in the molecule may be used alone or as a mixture thereof.

Preferably used examples excellent in balance between the storage stability and the cure reactivity are mixed systems of lactams and alcohols and of lactams and oximes. In particular, a mixed system of ε-caprolactam and methanol or a mixed system of ε-caprolactam and 2-butanone oxime is preferred.

The adding amount of the compound having one active hydrogen in the molecule is preferably 0.1 to 1.5 moles per mole of the aromatic diisocyanate.

In general, compounds having one active hydrogen in the molecule which have a powerful stabilizing effect tend to damage cure reactivity, while those which do not damage cure reactivity tend to be insufficient in stabilizing effect, and therefore the addition of excess, in particular, of the former should be avoided. As such compounds having one active hydrogen in the molecule which have a powerful stabilizing effect, there can be used alcohols and oximes, and their adding amount is preferably 0.5 mole or less per mole of the aromatic diisocyanate. For example, in the case of a polyamide-imide resin having a reduced viscosity of 0.1 to 0.25, the combination, for example, of 0.1 to 1.0 mole of a lactam and 0.1 to 0.5 mole of an alcohol and/or an oxim both per mole of the aromatic diisocyanate is preferred.

The compound having one active hydrogen in the molecule is added before, during or after the above-mentioned reaction. It may be added after a polyamide-imide resin is diluted with another solvent after being produced. It may be added either in full at a time or stepwise. It is preferably added before or during the rection from the viewpoint of controlling the polymerization reaction and suppressing the formation of bubbles by rapid decarboxylation. However, alcohols sometimes retard the polymerization and hence are preferably added after the reaction. When an alcohol is added and reacted before or after the above-mentioned reaction, it is preferably used in a proportion of less than 0.25 mole per mole of the aromatic diisocyanate. When it is used in a proportion of 0.25 mole or more per mole of the aromatic diisocyanate, it greatly damages polymerization or cure reaction.

In the field of polyurethane insulating paints and the like, there are sometimes used, as a part of materials, substances obtained by masking the isocyanate group or groups of an isocyanate-group-containing monomer or of a modified isocyanate-group-containing compound of a relatively low molecular weight with a phenolic compound such as phenol, cresol, xylenol or the like. Examples of such substances ae Coronate APS, MS-50 (trade names, manufactured by Nippon Polyurethane Co., Ltd.) Although the above-mentioned phenolic compounds are also one kind of the compounds having one active hydrogen in the molecule, no phenolic compound can be used at all in this invention. This is because as shown in Comparative Examples hereinafter given, the addition of phenolic compounds does not improve the storage stability of the resulting varnish at all.

When at least one compound having one active hydrogen in the molecule is added before or during the reaction, it is preferable to conduct the reaction at a temperature of 80° to 200° C. The temperature of 160° C. or lower is more preferable in order to suppress side reactions such as network formation. The temperature of about 130° C. is most suitable. When said compound is added after the reaction, it is preferable to conduct the raction at a temperature of 80° to 160° C. The reaction temperature can be lowered when the reaction is conducted at a higher resin content. For example, when the resin content is 60% by weight, the reaction temperature is most suitably about 110° C.

In the method wherein at least one compound having one active hydrogen in the molecule is added after the reaction, it is necessary to completely mask the terminal functional groups by further effecting the reaction at 0° to 130° C. up to 7-8 hours after the addition. The reaction temperature in this case is most suitably about 90° C.

The polyamide-imide resin obtained in this invention preferably has a reduced viscosity of 0.27 or lower. When its performance characteristics such as heat resistance, flexibility and the like are taken into consideration, its reduced viscosity is more preferably in the range of 0.05 to 0.25. Particularly when the cost and the performance characteristics are taken into consideration, the reduced viscosity is more preferably in the range of 0.1 to 0.23. The reduced viscosity is adjusted by measuring the solution viscosity during the reaction. The reduced viscosity is measured in the following manner. To 1 liter of water is added 15 g of a solution prepared by adding N-methylpyrrolidone to a part of a resin solution obtained by the above-mentioned reaction to as to adjust the concentration to 10% by weight, whereby the resin is precipitated. Subsequently, the precipitate is dried under a vacuum of 0.3 mm Hg at 60° C. for 10 hours to obtain a solid resin. The solid resin is dissolved in dimethylformamide to give a solution having a concentration of 0.5 g/dl, and the viscosity of the thus obtained solution is measured at 30° C. by using a Cannon-Fenske viscometer (viscometer number 50).

When the polyamide-imide resin obtained in this invention is made into a varnish, there may be used as auxiliary solvents xylene, NISSEKI HISOL-100, 150 (trade names, mfd. by Nippon Petrochemicals Co., Ltd., aromatic hydrocarbons obtained from petroleum, b.p. 80°–300° C.), methyl Cellosolve acetate, ethyl Cellosolve acetate, $\gamma$-butyrolacetone and the like in combination with the basic organic solvents described above.

If necessary, catalysts for accelerating curing or catalysts for dissociating urethane may be co-used in the polyamide-imide resin obtained in this invention. There are used, for example, tertiary amines such as triethylamine, triethylenediamine, dimethylaniline, dimethylethanolamine, 1,8-diazabicyclo(5,4,0)-undecene-7 (or its organic acid salts) and the like; organic tin compounds such as dibutyltin dilaurate, dibutyltin dioctoate and the like; organic titanium compounds such as tetrabutoxy titanate, tetraisopropoxy titanate, chelate or acylate compounds thereof, and the like; trialkylphosphine; etc. In particular, the tertiary amines are preferred. If necessary, various additives such as curing agents, surfactants and the like may be co-used.

As the curing agents, there can be used epoxy resins, amino resins, phenol-formaldehyde resins, polyester resins having one or more hydroxyl groups and/or carboxyl groups, adducts of an aromatic polyisocyanate with any of the previously described compounds containing one active hydrogen in the molecule, etc. There are preferably used adducts of any of the previously described aromatic diisocyanates or trimers thereof with a compound having one active hydrogen in the molecule, particularly preferably an $\epsilon$-capolactam adduct of 4,4'-diphenylmethane diisocyanate.

As another additives, benzoin is preferably used. Benzoin improves the smoothness of a coating film.

The thus prepared varnish has a high resin content of 40% by weight or more, has a solution viscosity satisfactory for workability, and is excellent in long-term storage stability. A baked coating film obtained by using the varnish is good in heat resistance and flexibility and moreover excellent in resistance to Freon gas and crazing resistance.

Although the polyamide-imide resin obtained in this invention can be used mainly as a varnish for heat-resistant electric wire, it is useful for other purposes, for example, heat-resistant sheets, heat-resistant laminate materials, heat-resistant molded articles, heat-resistant composite materials with glass fiber or carbon fiber, impregnation for electric insulation, casting varnish, etc.

This invention is explained below referring to Examples and Comparative Examples.

COMPARATIVE EXAMPLE 1

In a 2-liters four-necked flask equipped with a thermometer, a stirrer and an Allihn condenser, 452.5 g of 4,4'-diphenylmethane diisocyanate, 347.5 g of trimellitic acid anhydride and 1485.7 g of N-methylpyrrolidone were placed and reacted with stirring in a nitrogen stream at 100° C. for 1 hour, at 115° C. for 2 hours, and then at 120° C. for 2 hours, and subsequently heated to 135° C. to proceed the reaction (the resin content was 35% by weight). The reaction solution was diluted by adding 381 g of xylene. The resin content (calculated value) of the thus obtained varnish of a polyamide-imide resin was 30% by weight, and the initial viscosity (B-type viscometer, 30° C.) of the varnish was 31 poises. The reduced viscosity (0.5 g/dl, dimethylformamide, 30° C.) of the polyamide-imide resin was 0.42. The varnish underwent no change in viscosity at all even when allowed to stand at 40° C. for 1 month.

COMPARATIVE EXAMPLE 2

In a 2-liter four-necked flask equipped with a thermometer, a stirrer and an Allihn condenser, 452.5 g of 4,4'-diphenylmethane diisocyanate, 347.5 g of trimellitic acid anhydride and 533.3 g of N-methylpyrrolidone were placed and reacted with stirring in a nitrogen stream at 100° C. for 1 hour and then at 115° C. for 2 hours (the resin content was 60% by weight). The reaction solution was diluted by adding 267 g of N-methylpyrrolidone. The resin content (calculated value) of the thus obtained varnish of a polyamide-imide resin was 50% by weight, and the initial viscosity (B-type viscometer, 30° C.) of the varnish was 32 poises. The reduced viscosity (0.5 g/dl, dimethylformamide, 30° C.) of the polyamide-imide resin was 0.15. The varnish had a viscosity of 1,000 poises or higher after being allowed to stand at 23° C. for 10 days, and was thus very low in storage stability.

COMPARATIVE EXAMPLE 3

To the polyamide-imide resin varnish obtained in Comparative Example 2 was added 184.9 of m-cresol (0.946 mole per mole of the aromatic diisocyanate), and the resulting mixture was reacted in a nitrogen steam at 90° C. for 1 hour. The thus obtained varnish had an initial viscosity of 37 poises, and had a viscosity of 80 poises after being allowed to stand at 60° C. for 7 days. When allowed to stand at room temperature for 1 month, the varnish underwent a change in quality into a turbid solid completely devoid of fludity, so that its viscosity could not be measured.

EXAMPLE 1

To the polyamide-imide resin varnish obtained in Comparative Example 2 was added 193.4 g of ε-caprolactam (0.946 mole per mole of the aromatic diisocyanate), and the resulting solution was reacted in a nitrogen stream at 100° C. for 3 hours. The resulting resin had a reduced viscosity of 0.15 (0.5 g/dl, dimethylformamide, 30° C.). The thus obtained varnish had an initial viscosity of 38 poises, and had a viscosity of 48 poises after being allowed to stand at 40° C. for 1 month. Both of films obtained by applying this varnish to each glass plate and baking it at 200° C. for 30 minutes or at 250° C. for 30 minutes, respectively, had such excellent flexibility that they were not broken even when wrinkled several times.

EXAMPLE 2

To the polyamide-imide resin varnish obtained in Comparative Example 2 were added 96.7 g of ε-caprolactam (0.473 mole per mole of the aromatic diisocyanate) and 37.4 g of 2-butanone oxime (0.237 mole per mole of the aromatic diisocyanate), and the resulting solution was reacted in a nitrogen stream at 90° C. for 3 hours. The resulting resin had a reduced viscosity of 0.15 (0.5 g/dl, dimethylformamide, 30° C.). The thus obtained varnish had an initial viscosity of 35 poises, and had a viscosity of 37 poises after being allowed to stand at 40° C. for 1 month: it thus showed excellent storage stability. Both of films obtained by applying this varnish to each glass plate and baking it at 200° C. for 30 minutes or at 250° C. for 30 minutes, respectively, had such excellent flexibility that they were not broken even when wrinkled several times.

EXAMPLE 3

In a 2 liter four-necked flask equipped with a thermometer, a stirrer and an Allihn condenser, 452.5 g of 4,4'-diphenylmethane diisocyanate, 312.7 g of trimellitic acid anhydride, 58.3 g of 3,3',4,4'-benzophenonetetracarboxylic acid dianhydride, 96.7 g of ε-caprolactam and 533.3 g of N-methylpyrrolidone were placed and reacted with stirring in a nitrogen stream at 100° C. for 1 hour, at 120° C. for 1 hour, and then at 130° C. for 30 minutes (the resin content was 61% by weight). The reaction solution was diluted by adding 26.7 g of N-methylpyrrolidone and 240 g of dimethylformamide. Thereto was added 13.7 g of methanol, and the resulting solution was reacted at 90° C. for 2 hours. The reduced viscosity of the resulting resin was 0.14 (0.5 g/dl, dimethylformamide, 30° C.). The resin content (calculated value) of the thus obtained varnish of the polyamide-imide resin was 50.7% by weight. The varnish had an initial viscosity of 26 poises. It had a viscosity of 27 poises after being allowed to stand at 40° C. for 1 month and thus showed excellent storage stability.

EXAMPLE 4

In a 2-liter four-necked flask equipped with a thermometer, a stirrer and an Allihn condenser, 452.5 g of 4,4'-diphenylmethane diisocyanate, 347.5 g of trimellitic acid anhydride, 96.7 g of ε-caprolactam and 533.3 g of N-methylpyrrolidone were placed and reacted with stirring in a nitrogen stream at 90° C. for 1 hour, at 115° C. for 2 hours, and then at 135° C. for 1 hour (the resin content was 60% by weight). The reaction solution was diluted by adding 26.7 g of N-methylpyrrolidone and 240 g of dimethylformamide. Thereto was added 13.7 g of methanol, and the resulting solution was allowed to react at 90° C. for 3 hours. The reduced viscosity of the resulting resin was 0.16 (0.5 g/dl, dimethylformamide, 30° C.). The resin content (calculated value) of the thus obtained varnish of the polyamide-imide resin was 50% by weight. The varnish had an initial viscosity of 28 poises. It had a viscosity of 30 poises after being allowed to stand at 40° C. for 1 month, and thus showed excellent storage stability.

Each of the varnishes obtained in Examples 3 and 4 and Comparative Example 1 was coated on a copper wire and baked by a conventional method to obtain an enamel wire. Characteristics of the thus obtained enamel wires were evaluated. The results are shown in Table 1.

TABLE 1

| Example No. | Example 3 | Example 4 | Comparative Example 1 |
|---|---|---|---|
| Flexibility (no elongation)* | IX OK | IX OK | IX OK |
| Cut-through | >400 | >400 | >400 |

TABLE 1-continued

| Example No. | Example 3 | Example 4 | Comparative Example 1 |
|---|---|---|---|
| temperature* (2 kg) (°C.) | | | |
| Abrasion resistance* (600 g) (times) | 120 | 120 | 130 |
| Heat shock* (240° C. - 1 hr) | IX OK | IX OK | IX OK |
| BDP Retention** (260°C.) (%) | >80 | >80 | >80 |

Note Baking conditions:
Wire diameter: 1 mm, die coating 8 times, furnace length 4.5 m
Furnace temperature: inlet 300° C., middle 350° C., outlet 400° C.
Wire speed: 9 m/min (but 11 m/min in Comparative Example 1)
*According to JIS C 3003.
**Expressed in terms of the percentage of breakdown voltage retained after deterioration by heating for 168 hours, based on the initial value.

It is shown that Examples 3 and 4 having individual resin contents of about 50% by weight stabilized by suitable amounts of a lactam and an alcohol show greatly improved storage stability, as compared with Comparative Example 2 which was not stabilized, and are equal in the level of storage stability to Comparative Example 1 of the prior art. Examples 3 and 4 have enamel wire performance characteristics equal to those of Comparative Example 1, and are excellent also in cure reactivity. Further, Examples 3 and 4 make it possible to reduce the used amount of expensive N-methylpyrrolidone by about 40% of the used amount of N-methylpyrrolidone for Comparative Example 1 having a resin content of 30% by weight, and therefore they permit a marked reduction of the cost and moreover are very useful also from the viewpoint of reservation of natural resources and environmental sanitation.

As is clear from the above, the polyamide-imide resins according to this invention are not only good in storage stability but also excellent in heat resistance, flexibility and abrasion resistance, can be used in various heat-resistant materials including varnishes for heat-resistant electric wire, and hence are industrially very effective.

What is claimed is:

1. A process for producing a polyamide-imide resin which comprises:
   reacting an aromatic diisocyanate with a tricarboxylic acid anhydride in approximately equimolar amounts in the presence of a basic solvent while adjusting the resin content at 40% by weight or more, and
   adding at least one compound having one active hydrogen atom selected from the group consisting of a lactam, a lactam and an oxime, and a lactam and an alcohol before, during or after the reaction to adjust the reduced viscosity of the resin to 0.27 or lower.

2. A process according to claim 1, wherein the aromatic diisocyanate is 4,4'-diphenylmethane diisocyanate or tolylene diisocyanate.

3. A process according to claim 2, wherein the tricarboxylic acid anhydride is trimellitic anhydride.

4. A process according to claim 3, wherein the basic solvent is N-methylpyrrolidone.

5. A process for producing a polyamide-imide resin which comprises:
   reacting an aromatic diisocyanate with a tricarboxylic acid anhydride in approximately equimolar amounts in the presence of a basic solvent, while adjusting the resin content at 40% by weight or more, and
   adding at least one compound having one active hydrogen atom selected from the group consisting of a lactam, an alcohol, an imide, an oxime, and imine, and an oxazoline, before, during or after the reaction to adjust the reduced viscosity of the resin to 0.27 or lower.

6. A process according to claim 1, wherein 0.1 to 1.5 moles of the compound having one active hydrogen atom is used per mole of the aromatic diisocyanate.

7. A process for producing a polyamide-imide resin which comprises:
   reacting an aromatic diisocyanate with a tricarboxylic acid anhydride in approximately equimolar amounts in the presence of a basic solvent, while adjusting the resin content at 40% by weight or more, and
   adding at least one lactam before, during or after the reaction to adjust the reduced viscosity of the resin to 0.27 or lower.

8. A process according to claim 1, wherein the compound having one active hydrogen atom is added before or during the reaction of the aromatic diisocyanate and the tricarboxylic acid anhydride and conducting the reaction at a temperature of 80° to 200° C.

9. A process for producing a polyamide-imide resin which comprises:
   reacting an aromatic diisocyanate with a tricarboxylic acid anhydride in approximately equimolar amounts in the presence of a basic solvent, while adjusting the resin content at 40% by weight or more, and
   adding at least one compound having one active hydrogen atom, except for phenolic compounds after the reaction of the aromatic diisocyanate and the tricarboxylic acid anhydride, and
   allowing the at least one compound to react at 0° to 130° C. up to 7-8 hours.

10. A process according to claim 1, wherein the basic solvent is selected from the group consisting of N-methylpyrrolidone, dimethylformamide, and dimethylacetamide.

11. A process according to claim 1, wherein the resin content is adjusted to 40 to 80% by weight.

12. A process according to claim 7, wherein the lactam is ε-caprolactam.

13. A process according to claim 7, wherein the compound having one active hydrogen atom is a lactam selected from the group consisting of 2-pyrrolidone, ε-caprolactam, and lauryllactam.

14. A process according to claim 6, wherein the compound having one active hydrogen atom is a lactam.

15. A process according to claim 6, wherein the compound having one active hydrogen atom is a lactam selected from the group consisting of 2-pyrrolidone, ε-caprolactam, and lauryllactam.

16. A process according to claim 8, wherein 0.1 to 1.5 moles of the compound having one active hydrogen atom is used per mole of the aromatic diisocyanate.

17. A process according to claim 16, wherein the compound having one active hydrogen atom is a lactam.

18. A process according to claim 16, wherein the compound having one active hydrogen atom is a lactam selected from the group consisting of 2-pyrrolidone, ε-caprolactam and lauryllactam.

19. A process according to claim 9, wherein 0.1 to 1.5 moles of the compound having one active hydrogen atom is used per mole of the aromatic diisocyanate.

20. A process according to claim 19, wherein the compound having one active hydrogen atom is a lactam.

21. A process according to claim 19, wherein the compound having one active hydrogen atom is a lactam selected from the group consisting of 2-pyrrolidone, ε-caprolactam and lauryllactam.

* * * * *